US011849714B2

(12) United States Patent
Ritchie et al.

(10) Patent No.: US 11,849,714 B2
(45) Date of Patent: Dec. 26, 2023

(54) INSECT TRAPPING SYSTEMS

(71) Applicant: Verily Life Sciences LLC, South San Francisco, CA (US)

(72) Inventors: Scott Ritchie, Queensland (AU); Kyran M. Staunton, Queensland (AU); Wei Xiang, Queensland (AU); Yu Han, Harbin (CN); Nigel Snoad, Woodside, CA (US); Jianyi Liu, Santa Clara, CA (US); Jacob Crawford, Berkeley, CA (US); Mark Desnoyer, San Francisco, CA (US)

(73) Assignee: Verily Life Sciences LLC, South San Francisco, CA (US)

(*) Notice: Subject to any disclaimer, the term of this patent is extended or adjusted under 35 U.S.C. 154(b) by 23 days.

(21) Appl. No.: 16/752,171

(22) Filed: Jan. 24, 2020

(65) Prior Publication Data

US 2020/0305406 A1 Oct. 1, 2020

Related U.S. Application Data

(60) Provisional application No. 62/826,842, filed on Mar. 29, 2019.

(51) Int. Cl.
*A01M 1/10* (2006.01)
*A01M 1/02* (2006.01)
(Continued)

(52) U.S. Cl.
CPC ............ *A01M 1/106* (2013.01); *A01M 1/023* (2013.01); *A01M 1/026* (2013.01); *A01M 1/04* (2013.01);
(Continued)

(58) Field of Classification Search
CPC ...... A01M 1/106; A01M 1/023; A01M 1/145; A01M 1/12; A01M 1/2005; A01M 1/2016
(Continued)

(56) References Cited

U.S. PATENT DOCUMENTS 1,485,867 A * 3/1924 Mooney .................. A01M 1/02
43/121
1,578,061 A * 3/1926 Abadie .................... A01M 1/02
43/65
(Continued)

FOREIGN PATENT DOCUMENTS

CN 1111088 A 11/1995
CN 101820750 A 9/2010
(Continued)

OTHER PUBLICATIONS

International Application No. PCT/US2020/015051, "International Search Report and Written Opinion", dated Apr. 8, 2020, 12 pages.
(Continued)

*Primary Examiner* — Darren W Ark
*Assistant Examiner* — Zoe Tam Tran
(74) *Attorney, Agent, or Firm* — Kilpatrick Townsend & Stockton LLP

(57) ABSTRACT

An insect trapping system includes an enclosed container having an entrance hole formed in a vertical wall and an acoustic lure device located within the container. The enclosed container may be formed from a transparent material. The system may also include a support stand, formed from a dark-colored material, and used to support the container.

30 Claims, 9 Drawing Sheets

(51) Int. Cl.
  *A01M 1/04* (2006.01)
  *A01M 1/14* (2006.01)
  *A01M 1/20* (2006.01)
(52) U.S. Cl.
  CPC .......... *A01M 1/145* (2013.01); *A01M 1/2016* (2013.01); *A01M 2200/012* (2013.01)
(58) Field of Classification Search
  USPC ................ 43/114, 107, 113, 122, 132.1, 131
  See application file for complete search history.

(56) References Cited

U.S. PATENT DOCUMENTS

| | | | | |
|---|---|---|---|---|
| 1,999,342 | A * | 4/1935 | Reynolds | A01M 1/02 43/121 |
| 2,786,298 | A * | 3/1957 | Smith | A01M 1/20 43/118 |
| 3,341,967 | A * | 9/1967 | Kelley | A01M 1/10 43/65 |
| 3,940,874 | A * | 3/1976 | Katsuda | A01M 1/14 43/114 |
| 4,208,828 | A * | 6/1980 | Hall | A01M 1/02 43/121 |
| 4,608,774 | A * | 9/1986 | Sherman | A01M 1/02 43/114 |
| D368,952 | S * | 4/1996 | Flowers | D22/122 |
| 6,164,010 | A * | 12/2000 | Snell | A01M 1/026 43/114 |
| 7,243,458 | B2 * | 7/2007 | Miller | A01M 1/06 43/139 |
| 8,109,036 | B1 * | 2/2012 | Wilbanks | A01M 1/06 43/112 |
| 9,915,732 | B2 | 3/2018 | Weber-Grabau | |
| 11,116,199 | B2 * | 9/2021 | Nyberg | A01M 1/106 |
| 2003/0061757 | A1 * | 4/2003 | Askin | A01M 1/223 43/112 |
| 2005/0012477 | A1 * | 1/2005 | Piana | A47C 20/041 318/109 |
| 2008/0060256 | A1 * | 3/2008 | Chu | A01M 1/023 43/107 |
| 2008/0168702 | A1 | 7/2008 | Jaffrey | |
| 2013/0025183 | A1 * | 1/2013 | Durand | A01M 1/2016 43/107 |
| 2013/0298444 | A1 * | 11/2013 | Strube | A01M 1/04 43/113 |
| 2015/0020437 | A1 * | 1/2015 | Crawley | A01M 1/04 43/113 |
| 2016/0235050 | A1 * | 8/2016 | Janet | A01M 1/14 |
| 2017/0273290 | A1 | 9/2017 | Jay | |
| 2017/0303523 | A1 * | 10/2017 | Sandford | A01M 1/023 |
| 2018/0279598 | A1 * | 10/2018 | Hur | A01M 1/106 |
| 2018/0288992 | A1 * | 10/2018 | Gallegos | A01M 1/106 |
| 2020/0344992 | A1 * | 11/2020 | Kaye | A01N 63/23 |
| 2020/0396977 | A1 * | 12/2020 | Jaffre | A01M 1/106 |

FOREIGN PATENT DOCUMENTS

| | | | | |
|---|---|---|---|---|
| CN | 201938254 | U | 8/2011 | |
| EP | 0899701 | A2 * | 3/1999 | .......... G08B 13/193 |
| WO | 2005022991 | | 3/2005 | |
| WO | WO-2008052217 | A2 * | 5/2008 | ............ A01M 1/06 |
| WO | 2016064735 | | 4/2016 | |
| WO | 2018017982 | A1 | 1/2018 | |
| WO | 2018205025 | | 11/2018 | |
| WO | 2019007494 | | 1/2019 | |
| WO | 2019020694 | A1 | 1/2019 | |
| WO | 2019036463 | | 2/2019 | |

OTHER PUBLICATIONS

Chinese Application No. 202080026478.5 , "Office Action", dated Jan. 31, 2023, 12 pages.
Balestrino et al., "A Sound Trap for Aedes Albopictus (Skuse) Male Surveillance: Response Analysis to Acoustic and Visual Stimuli", Acta Tropica, vol. 164, Sep. 2016, pp. 448-454.
Eiras et al., "Development of the Gravid Aedes Trap for the Capture of Adult Female Container-Exploiting Mosquitoes (Diptera: Culicidae)", Journal of Medical Entomology, vol. 51, No. 1, Jan. 1, 2014, pp. 200-209.
Johnson et al., "A Low-Cost, Battery-Powered Acoustic Trap for Surveilling Male Aedes Aegypti During Rear-and- Release Operations", PLOS One, vol. 13, No. 8, Aug. 2, 2018, pp. 1-10.
Singapore Patent Application No. 11202110080V, Written Opinion, dated Aug. 7, 2023, 14 pages.

* cited by examiner

INSECT TRAPPING SYSTEMS

CROSS-REFERENCE TO RELATED APPLICATIONS

This application claims priority to U.S. Provisional Patent Application No. 62/826,842, titled "Insect Trapping Systems," filed Mar. 29, 2019, the entirety of which is hereby incorporated by reference.

BACKGROUND

Conventionally, insect traps, especially those dealing with disease transmitting insects such as mosquitoes, have been designed to capture insects and do not discriminate between males and females or even species of insects. As a result, these traps may also result in undesirable by-catch (e.g., insects other than a target sex and/or other types of insects).

BRIEF SUMMARY

Various examples are described relating to insect trapping systems including insect trapping apparatuses, and corresponding methods.

One general aspect includes an insect trapping system, including a trapping container including a top, a bottom, and at least one side wall which together define an interior volume, where an entrance hole is formed in the at least one side wall and allows access to the interior volume. The insect trapping system also includes an acoustic lure device disposed within the interior volume of the trapping container adjacent the entrance hole, the acoustic lure device to output an acoustic tone for an insect population. The insect trapping system also includes a support stand to physically support the trapping container, the support stand to function as a visual lure for the insect population.

Another general aspect includes an apparatus, including a trapping container including a top, a bottom, and at least one side wall that together define an interior volume. The apparatus also includes a diverter wall positioned within the interior volume, the diverter wall dividing the interior volume to define a first chamber and a second chamber, where a window is formed in the diverter wall that connects the first chamber and the second chamber, and where an entrance hole is formed in the at least one side wall and allows access to the first chamber. The apparatus also includes an acoustic lure device disposed within the first chamber adjacent the entrance hole, the acoustic lure device to output an acoustic tone.

Another general aspect includes a method, including providing a container that includes a bottom and a perimeter wall that encircles the bottom to define an interior volume. The method also includes installing a diverter wall within the interior volume to define a first chamber and a second chamber. The method also includes forming an entrance hole in the perimeter wall to enable access to the first chamber. The method also includes forming a window in the diverter wall that connects the first chamber and the second chamber. The method also includes installing an acoustic lure in the first chamber.

Another general aspect includes a computer-implemented method, including instructing an acoustic lure located within an interior volume of an insect trapping container to output an acoustic tone. The computer-implemented method also includes receiving sensor data from a sensor package located within the interior volume of the insect trapping container, the sensor data representative of insects within the interior volume; responsive to receiving the sensor data. The computer-implemented method also includes instructing an imaging device to capture image data representative of the insects within the interior volume, or determining insect count data based on the sensor data. The computer-implemented method also includes transmitting output data to a remote computing system, the output data including at least one of a first portion of the image data or a second portion of the insect count data. Other embodiments of this aspect include corresponding computer systems, apparatus, and computer programs recorded on one or more computer storage devices, each configured to perform the actions of the methods.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
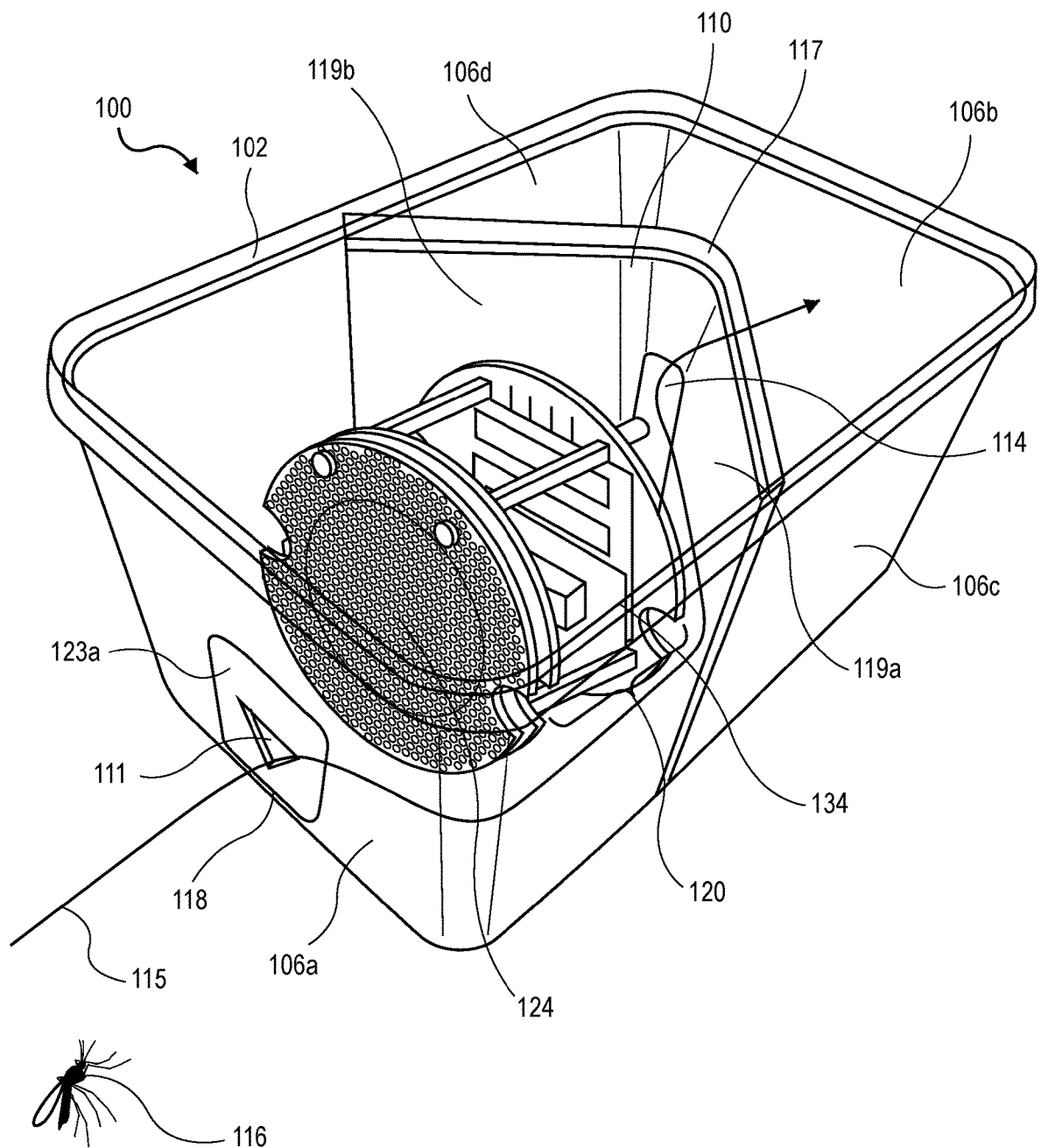
FIG. 1 illustrates a perspective view of an insect trapping system, according to at least one example.

Examples are described herein in the context of a trap for adult stage insects, and in particular adult stage mosquitoes of particular species. Those of ordinary skill in the art will realize that the following description is illustrative only and is not intended to be in any way limiting. For example, the techniques described herein can be used to trap mosquitoes or other insects in various life stages, in addition to certain non-insect invertebrates. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with applicationand business-related constraints, and that these specific goals will vary from one implementation to another and from one developer to another.

As part of a sterile insect technique (SIT) program or otherwise, a large number of reared male insects is released as compared to wild insects. The ratio of reared insects to wild insects may be around 10 times as many. To achieve such a ratio, it is desirable to determine approximately the number of insects in the wild population. This can be done using examples according to the insect trapping systems described herein. In addition, after the reared insects have been released, it is desirable to determine whether a decrease in the wild population was achieved by the program. This can also be done using examples according to the insect trapping systems described herein.

In most SIT programs, after release monitoring constitutes one of the largest costs. This is because, in part, existing insect traps, which unlike the trapping system described herein, result in a large quantity of by-catch (e.g., insects other than those of interest). Counting the insects captured using these existing insect traps requires a user to open the traps and count the insects of interest while ignoring the by-catch. Even existing insect traps that include cameras to capture images of the catches and telemetry systems to transmit the images still require a human to view the images of the catches and/or require specialized and computationally-intensive systems to analyze the images to discriminate between insects of interest and by-catch.

Some SIT programs such as those that infect male mosquitoes with the *Wolbachia* bacteria, may require counting of males, both wild and reared, before, during and after the program concludes. The insect trapping system described herein provides an inexpensive way to explicitly capture male *Aedes*, particularly *Ae. aegypti* and *Ae. albopictus*. Although the insect trapping system may also be used to trap different mosquito species. The ability to avoid by-catch makes the trap attractive compared to conventional traps that collect very large amounts of by-catch. The insect trapping system is also useful to determine the size of male *Aedes* populations, information that is critical for "rear and release" based control strategies deploying *Wolbachia* infected, genetically modified, or sterilized male mosquitoes. The insect trapping system may also be used to determine the survival of released mosquitoes, as well as the presence/absence of male mosquitoes. This is of particular interest to release programs designed to suppress or eliminate target *Aedes* mosquitoes.

In a particular example, the insect trapping system described herein selectively captures males of day active *Aedes* mosquitoes. The trap is mounted on a visual lure and is fitted with an acoustic lure device. The visual lure, which includes a black colored base, functions as a swarm marker for *Aedes* mosquitoes. The acoustic lure device plays a tone representing the fundamental tone created by the wingbeat frequency of the female mosquito (e.g., 500 Hz). The trap includes a clear or translucent plastic box into which male *Aedes* are attracted and captured. The box has a small triangular entry behind which the acoustic lure device is set. The triangular shape and the orientation of the triangular entry is desirable as it allows insects to fly into the box in a normal upright position without beating their wings into edges of the entrance. Sound emitting from this hole attracts male *Aedes* which enter the box and are captured. The acoustic lure device can be programmed to play different frequencies, change volume level, alternate sound with quiet periods, and turn off at night (e.g., turned on and off at some preset schedule). Male mosquitoes entering the trap can be captured by using glue panels or by treating the inside of the box with insecticide.

In some examples, the insect trapping system described herein can be used to capture and count marked insects. For example, reared insects can be marked with a phosphorescent paint or other material that can be detected using a black light or other device. Once the insects are within the insect trapping system, their distinctive markings can be identified and imaged.

The insect trapping system described herein enables quick, cheap, efficient, and targeted counting of specific species of male mosquitoes. For example, properties of an acoustic lure device and a visual lure can be tuned to attract the species of interest (e.g., frequency, sound, etc. of acoustic lure device and color, size, etc. of visual lure). The insect trapping system can be assembled from inexpensive items and can operate using only a small battery. Additionally, functionality such as imaging, telemetry, and on-demand reconfiguring may also be included in the insect trapping system, depending on the implementation.

This illustrative example is given to introduce the reader to the general subject matter discussed herein and the disclosure is not limited to this example. The following sections describe various additional non-limiting examples of insect trapping systems.

FIGS. 1, 2, 3, and 4, respectively, illustrate a perspective view, a side profile view, a top view, and an end view of an insect trapping system 100, according to various examples. The insect trapping system 100 includes a container 102 formed from a bottom 104 and at least one side wall 106, which together define an interior volume 108. In the illustrated example, the container 102 takes the form of a rectangle and therefore includes four vertical walls 106 each connected to the bottom 104. The container 102 may also take the form of other standard shapes (e.g., square, cylinder, etc.). In a particular example, the container 102 is a 2.5 liter storage container (e.g., the interior volume 108 equals about 2.5 liters) that has a base of about 12 cm by about 14 cm and a height of about 11.5 cm.

Generally, the insect trapping system 100 is configured to attract an insect 116 into the container 102 along a path 115.

Figure 5:
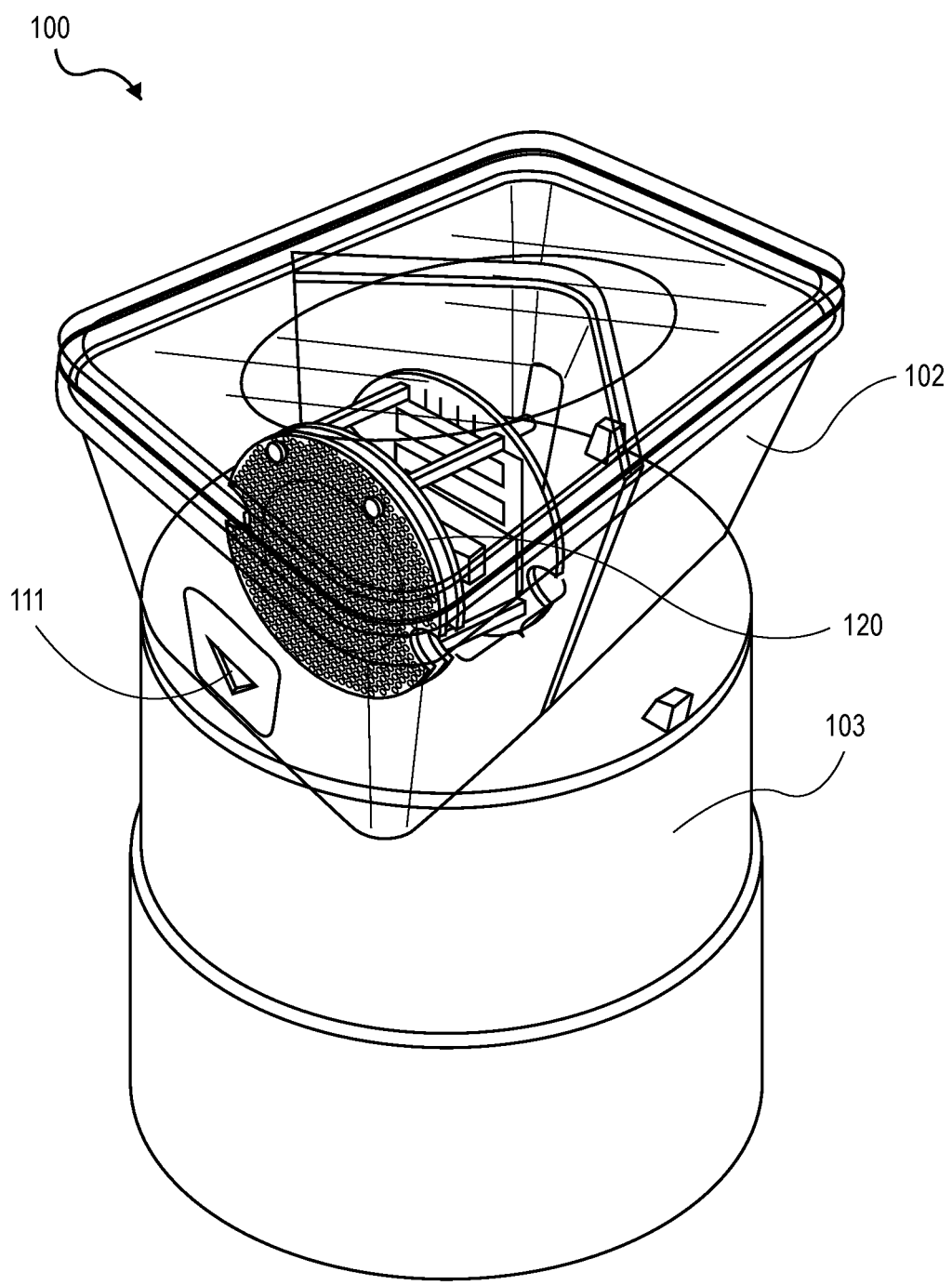
FIG. 5 illustrates a perspective view of the insect trapping system of FIG. 1, according to at least one example.

A visual lure such as a support stand 103, such as the one illustrated in FIG. 5, and an acoustic lure device (e.g., 120) attract the insect 116 from an outside environment, through an entrance hole 111 (e.g., an insect opening), and into the interior volume 108 of the container 102. Within the interior volume 108, the insect 116 is trapped using a glue panel or killed using an insecticide. The path 115 is illustrated as one of numerous possible paths that the insect 116 can take once within the container 102. The visual lure, e.g., the support stand 103, may be a specific color (e.g., a dark opaque color such as black or red). In some examples, the container 102 may be used without the support stand 103. For example, the container 102 could be placed next on the ground next to a crab hole to capture Herve's *Aedes Polynesiensis*.

With this in mind, the container 102 is mounted or otherwise supported by the support stand 103, as shown in FIG. 5. The support stand 103, which can be included in the system 100 or can be found within the environment in which the system will be deployed (e.g., a dark stump, an existing wall, etc.), is formed from a dark colored material or otherwise painted, stained, treated, or the like to form a dark surface. The support stand 103 functions as a visual lure to attract insects, such as the insect 116. In a particular use case, the support stand 103 is black in color. The black color, and in some cases red, is a swarm marker for male *Aedes* mosquitoes. If other insects, including other mosquitoes are targeted, colors other than black or red may be employed. In this manner, the color of the support stand 103 is a tunable parameter.

In the illustrated examples, the support stand 103 is formed from one or more plastic plant buckets such as those that are readily available from local hardware stores. It should be understood that the support stand 103 may be formed from any other suitable combination of other structures and/or may be one single structure and/or may be manufactured specifically for this application. In some examples, the top surface of the support stand 103 includes openings and is devoid of ridges. This helps to avoid standing water on the top surface, which in turn discourages females from laying eggs at the top surface, e.g., above standing water.

Figure 2:
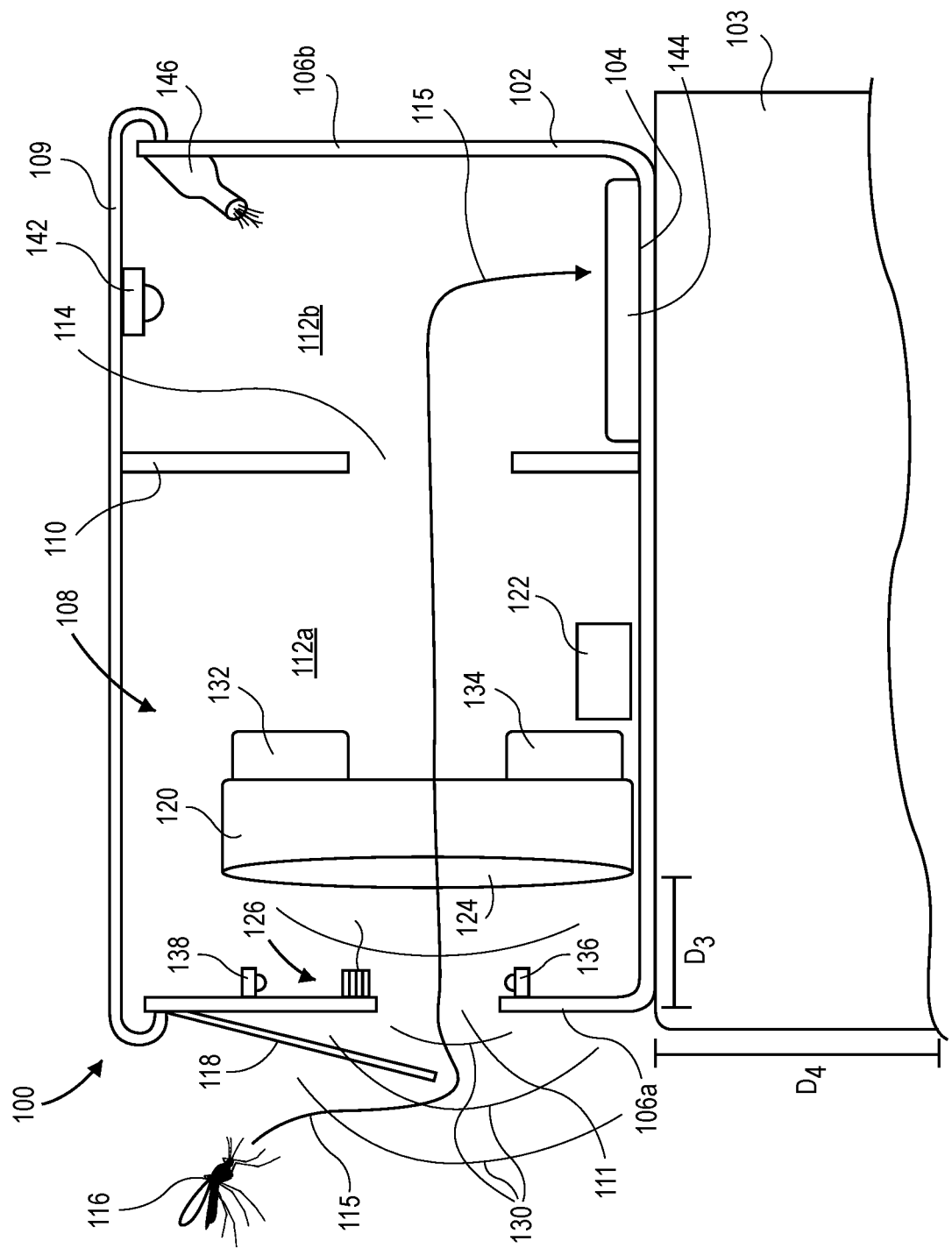
FIG. 2 illustrates a side profile view of the insect trapping system of FIG. 1, according to at least one example.

As illustrated in FIG. 2, height $D_4$ of the support stand 103 is selected to maximize the number of insects 116 that are drawn into the entrance hole 111, which is a function of the height of the entrance hole 111 from the ground. In some examples, $D_4$ is about 45 cm. In other examples, $D_4$ is between about 45 cm and about 80 cm, less than 45 cm, or greater than 80 cm. Such a height enables a swarm of insects 116 to congregate near the top of the support stand 103 and adjacent the entrance hole 111. $D_4$ may also be less than 45 cm. For example, such a smaller $D_4$ may desirable for use in an indoor trap (e.g., for use inside an apartment) where a discrete yet effective trap would be appreciated.

The area immediately surrounding the entrance hole 111 on the outside of the container 102 and/or on the inside of the container 102 may be coated with an opaque material. For example, on the outside of the container 102, the area 123a surrounding the entrance hole 111 may be painted or otherwise coated with a pale/light-colored material (e.g., white, gray, yellow, etc.). Meanwhile, on the inside of the container 102, the area 123b surrounding the entrance hole 111 may be painted or otherwise coated with a dark-colored material (e.g., black, red, etc.). The dark-colored material is selected to reduce the rate at which insects exit through the entrance hole. As the captured insects may fly towards light to escape they may avoid exiting the container 102 via the entrance hole 111 if there is a dark coloration around it. In some examples, the material may be colored tape, paint, colored or painted plastic that is connected to the container 102, and any other suitable material.

The container 102 also includes a lid 109 (in FIG. 1, the lid 102 has been removed from the container 102). In some examples, the lid 109 is removably attached to the side walls 106 using latches, zips, buckles, snaps, an interference fit, or in any other suitable manner. The lid 109 may be removable to access the contents of the container 102 to service the trap (for example, configure the components included therein, count insects, remove insects, etc.). In some examples, the lid 109 is attached to the side walls 106. In this example, the contents of the container 102 may be accessible in some other manner such as via a closeable window through one of the walls 106.

Figure 4:
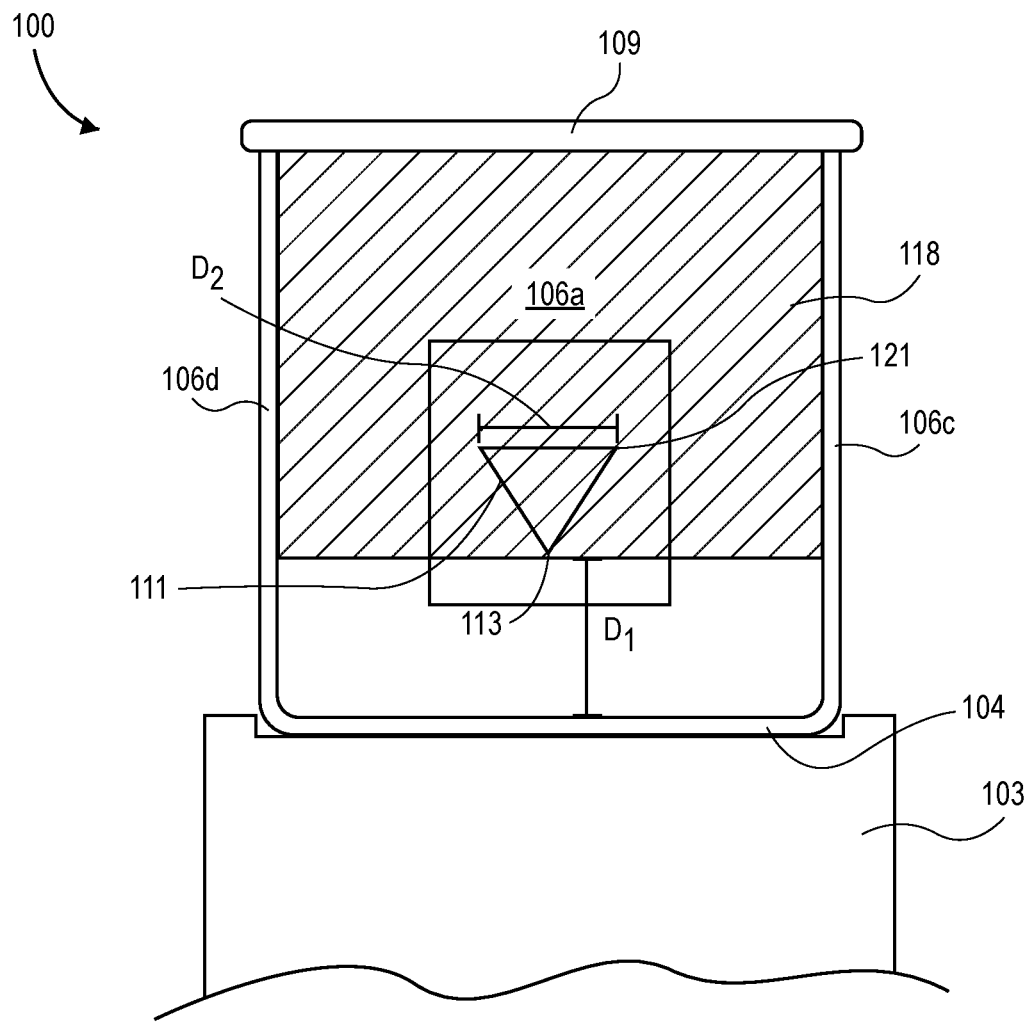
FIG. 4 illustrates an end view of the insect trapping system of FIG. 1, according to at least one example.

The container 102 also includes the entrance hole 111 that is formed in front wall 106a. As illustrated in FIG. 4, the entrance hole 111 has a triangular shape. The orientation of the triangular shaped entrance hole 111 is an inverted triangle, i.e., an apex 113 of the entrance hole 111, which is opposite a base 121, is pointed toward the bottom 104 of the container 102. In some examples, the triangle is an equilateral triangle. The triangular shape is desirable as it allows insects such as the insect 116 to fly through without beating their wings into edges of the entrance hole 111 (e.g., because the insect's 116 wings are at the top of the insect 116). Although a triangular shape is desirable, in other examples, openings having shapes other than triangular may also be used. As the entrance hole 111 is quite small (2 cm on a side), the probability of other flying insects entering the container 102 is reduced. Indeed, in some examples, less than 5% of the total insect catch is non-target insects. In some examples, triangle shape of the entrance hole 111 matches the light cone from the sensor package 126, as discussed with respect to FIG. 6.

As illustrated in FIG. 4, the entrance hole 111 is formed within the front wall 106a at a height of $D_1$. In the illustrated example, $D_1$ is between 3-4 cm. In other examples, $D_1$ is greater than 4 cm or less than 3 cm. Generally, the entrance hole 111 has a width $D_2$. In the illustrated example, $D_2$ is about 2 cm. In other examples, $D_2$ is greater than or less than 2 cm. If the size of the entrance hole 111 is much larger than 2 cm, the insects 116 may leave through the entrance hole more frequently, instead of continuing through the interior volume 108, along the path 115.

In some examples, the front wall 106a is flat. In some examples, the entrance hole 111 is positioned vertically such that the middle of the entrance hole 111 is located below a centerline of the acoustic lure device 120.

The container 102 also includes a rain shield 118. The rain shield 118 functions to block rain or other liquid from entering through the entrance hole 111. In some examples, the rain shield 118 extends below the apex 113. In other examples, the rain shield 118 extends between the apex 113 and the base 121. In yet other examples, the rain shield 118 terminates above the base 121. The rain shield 118 is formed from a thin transparent material such as sheet plastic. The rain shield 118 is attached to the container 102 such that it is held at a slight angle. This allows the rain shield 118 to block rain, and does not impede movement of the insects 116 into the entrance hole 111. In some examples, the rain shield 118 can be removed from the container 102.

The container 102 illustrated in FIG. 1 is a reusable container formed from a clear or translucent material such as plastic. It should be understood, however, that the container 102 may be formed from other materials (e.g., glass, wood, rubber, etc.) having different degrees of opacity ranging from transparent to opaque. Using materials that range from transparent to translucent allows ambient light to illuminate the interior volume 108, which may improve capture rates, especially for those insects that are active during the daytime hours. In some examples, the container 102 includes artificial lights therein to attract insects 116 and/or to provide light for the insects to navigate within the container 102.

Figure 3:
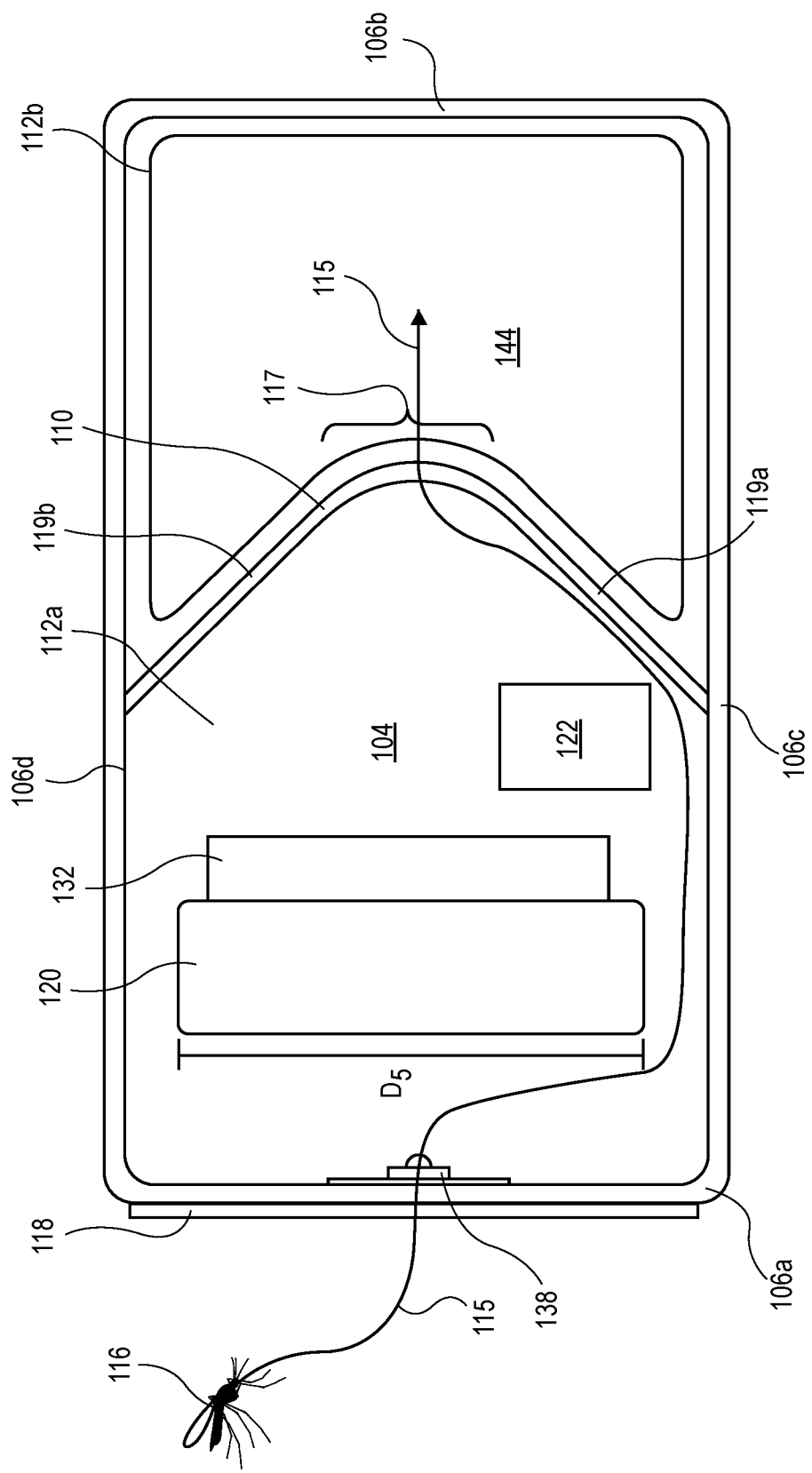
FIG. 3 illustrates a top view of the insect trapping system of FIG. 1, according to at least one example.

As illustrated in FIGS. 1-3, the container 102 includes a diverter wall 110 that divides the interior volume 108 into a first chamber 112a and a second chamber 112b. Vertical distal edges of the diverter wall 110 physically contact vertical internal surfaces of the container 102. The diverter wall 110 includes a window 114 through which insects such as the insect 116 can move. As illustrated in FIG. 3, the diverter wall 110 has a curved V shape, with an interior of the V shape being directed toward the entrance hole 111. The V-shaped diverter wall 110 includes a vertex 117 and a pair of sub-walls 119a, 119b. In some examples, the diverter wall 110 is flat or includes more than one bend or curve. The window 114, in some examples, may be formed in the region of the diverter wall 110 that includes the vertex 117.

In some examples, the shape of the diverter wall 110 is designed to exploit a characteristic of the insect 116. The characteristic describes that once the insect 116 is within the first chamber 112a, it will head to a wall (e.g., the side wall 106c or 106d) until it reaches the diverter wall 110, and then will follow the diverter wall 110 until it finds an opening (e.g., the window 114). Thus, as shown in FIG. 3, the path 115 is illustrated as extending along the side wall 106c and the sub-wall 119a until it intersects the window 114. Because the side wall 106 and the diverter wall 110 are translucent, ambient light is present in the first and second chambers 112a, 112b. This helps keep the insect 116 moving.

The window 114 can have any suitable shape, which may be larger than, for example, the entrance hole 111. The window 114 may extend the entire height of the diverter wall 110 and/or may include more than one window 114 within the diverter wall 110 (e.g., one or more openings in each of the sub-walls 119).

As illustrated in FIG. 2, within the first chamber 112a is mounted an acoustic lure device 120, a sensor communication package 122, and a sensor package 126. Generally, the acoustic lure device 120 is configured to output an acoustic tone 130 to attract an insect population. The sensor package 126 is configured to detect when the insect 116 passes through the entrance hole 111. The sensor communication package 122 is configured to manage the operation of the electronic components of the system 100 and enable communication with a remote electronic device. In some examples, the sensor package 126 and the sensor communication package 122 are not included in the insect trapping system 100.

Turning now to the acoustic lure device 120, in this example it is mounted within the container 102 at a location that is adjacent to the entrance hole 111. A speaker component 124 of the acoustic lure device 120 is directed toward the entrance hole 111. In some examples, the speaker component 124 is spaced apart from the front wall 106a at a dimension, $D_3$. In some examples, $D_3$ is between 4-5 cm. In other examples, $D_3$ is greater than 5 cm or less than 4 cm. $D_3$ can be adjusted to tune properties of the acoustic tone 130. In some examples, $D_1$, with respect to a height of the speaker component 124, can be adjusted to tune properties of the acoustic tone 130. In some examples, the acoustic lure device 120 includes a width $D_5$ (or diameter in the case of a circular speaker component 124). In some examples, $D_5$ is about 6.6 cm. In other examples, $D_5$ is less than 6.6 cm or greater than 6.6 cm.

The acoustic tone 130 mimics a wingbeat frequency of females insects 116 and emits via the entrance hole 111. Thus, the acoustic tone 130 functions to attracts male insects, rapidly drawing them into the container 102 via the entrance hole 111. In some examples, the acoustic tone 130 is directed such that it crosses a flight path of the insect 116. The acoustic lure device 120 is positioned to avoid echoing of the acoustic tone 130 within the interior volume 108.

The acoustic tone 130 in this example is a clear fundamental tone of about 500 Hz. In some examples, the acoustic tone 130 is between 400-600 Hz. The acoustic tone 130 can be selected to resonate at 500 Hz for reduced energy use. In some examples, the acoustic tone 130 is adjustable in 50 Hz increments or in other larger or smaller increments. In some examples, a looped recording of a female mosquito can be used. In some examples, the volume of the acoustic tone 130 is about 60 dB, between 55 and 70 dB, less than 55 dB, or greater than 70 dB. The volume can be selected to ensure that the insects 116 can hear the acoustic tone 130, but not so loud that they become less interested. The volume and the frequency can be adjustable parameters. For example, the volume may be turned up in certain environments (e.g., in a remote environment) and turned down in others (e.g., in a neighborhood). In some examples, the volume is varied according to a schedule (e.g., cycled between 15 minutes at low volume, 15 minutes off, 15 minutes at high volume). In some examples the frequency may also descend and ascend in a sweeping tone rather than simply play a single frequency.

The acoustic lure device 120 may also include a local controller 132 and a power source 134. The local controller 132, which includes any suitable microcontroller, processor, chip, or other control device, is configured to control the operation of the acoustic lure device 120. In some examples, the local controller 132 is programmable using one or more interfaces such as a set of buttons, a touch screen, dials, indicators, and the like to output information and receiver user inputs. In this manner, the interfaces can be used to configure the acoustic lure device 120. For example, the local controller 132 can be used to program the acoustic lure device 120 to play different frequencies, change volume level, alternate sound with quiet periods, set modes (e.g., time of day, cycle time, tone, etc.), and turn off at night.

Whether as part of the local controller 132 or as a separate component, the acoustic lure device 120 may include a photodetector. Using the photodetector, the acoustic lure device 120 determines when to turn on and turn off, e.g., on during the day and off during the night or vice versa. In some examples, it may be desirable to operate the acoustic lure device 120 during the daytime when targeting male *Aedes* mosquitoes. Turning off at night avoids by-catch and conserves battery life.

Whether as part of the local controller 132 or under control of a separate component, the acoustic lure device 120 may be selectively and intermittently activated (e.g., on/off cycle of 30 s/30 s). This approach will conserve battery life and alleviates concerns that constant playing of the acoustic tone 130 may result in desensitization in the insects 116. In some examples, the operation of the acoustic lure device 120 may depend on an environment in which it operates (e.g., insects may adjust their behavior as they adapt to the environment).

Whether as part of the local controller 132 or under control of a separate component, the acoustic lure device 120 can include a real-time clock that syncs to an almanac to track true sunrise/sunset times.

The power source 134 is configured to power the acoustic lure device 120. In some examples, the power source 134 powers others electronic components of the system 100. For example, when included, the power source 134 can power the sensor communication package 122 and the sensor package 126. The power source 134 includes any suitable power source such as, for example, one or more batteries (rechargeable or otherwise), fuel cell, solar panel array, plug for receiving power from an external power source, etc.

Figure 6:
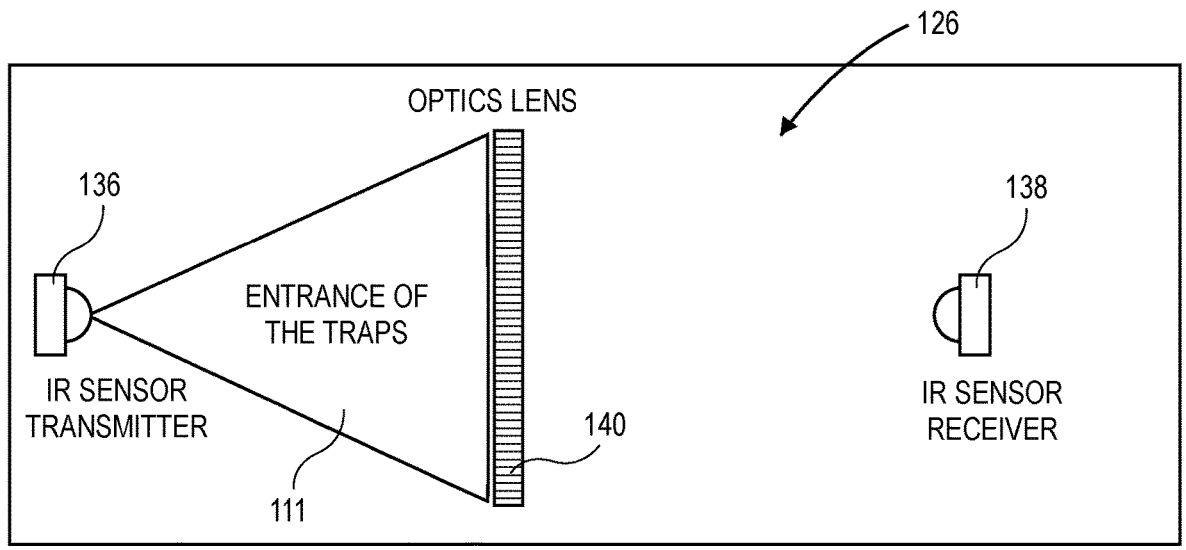
FIG. 6 illustrates a diagram of a sensor apparatus for use with the insect trapping system of FIG. 1, according to at least one example.

The sensor package 126, which is also illustrated in FIG. 6, is installed at the entrance hole 111 to count the number of insects 116 entering the container 102. The sensor package 126 includes an infra-red (IR) sensor transmitter 136, an IR sensor receiver 138, and an optics lens 140. The IR sensor transmitter 136 is mounted to the front wall 106a at a location below the entrance hole 111. Due to the upside-down triangle entrance hole 111, the IR sensor receiver 138 receiver faces down, while the IR sensor transmitter 136 faces up. In this way, the sensor package 126 can filter out interference and work under any ambient light conditions.

The working principle of the sensor package 126 is that the insect 116 breaks a beam of light (emitted by the IR sensor transmitter 136) and causes a change of the rays on a light sensitive detector (e.g., the IR sensor receiver 138).

Any insects crossing the rays should be able to trigger an analog signal on the sensor package 126. Any light intensity variation of a minimum time period will cause an "insect detected" signal.

To optimize power consumption, the components of the sensor package 126 consume very little power, while still obtaining the trigger signal. In some examples, only one IR sensor transmitter 136 and one IR sensor receiver 138 is chosen to transmit and receive infrared rays for the mechanism to function. This design has the advantage of minimizing the power consumption.

The optics lens 140, which may include one or more cylinder Fresnel lenses, makes the rays cover the whole area of the entrance hole 111, while focusing the transmitting rays onto the IR sensor receiver 138. In some examples, instead of Fresnel lenses, spherical lenses can be used. In some examples, light-emitting diode collimators made of plastic and silicone may be used to produce the desired structured light. In some examples, the optics lens 140 is excluded from the system 100. If the IR sensor transmitter 136 is at the focal point of the optics lens 140, parallel rays are produced on the other side of the optics lens 140. Increasing the distance causes the rays to focus. In the described embodiment, the optics lens 140 is placed further from the focal point so as to enable the rays to converge. The IR sensor receiver 138 is optimized at the locations where the rays focus. In this manner, any insect crossing the entrance hole 111 will cause a change in the detected light.

Figure 7:
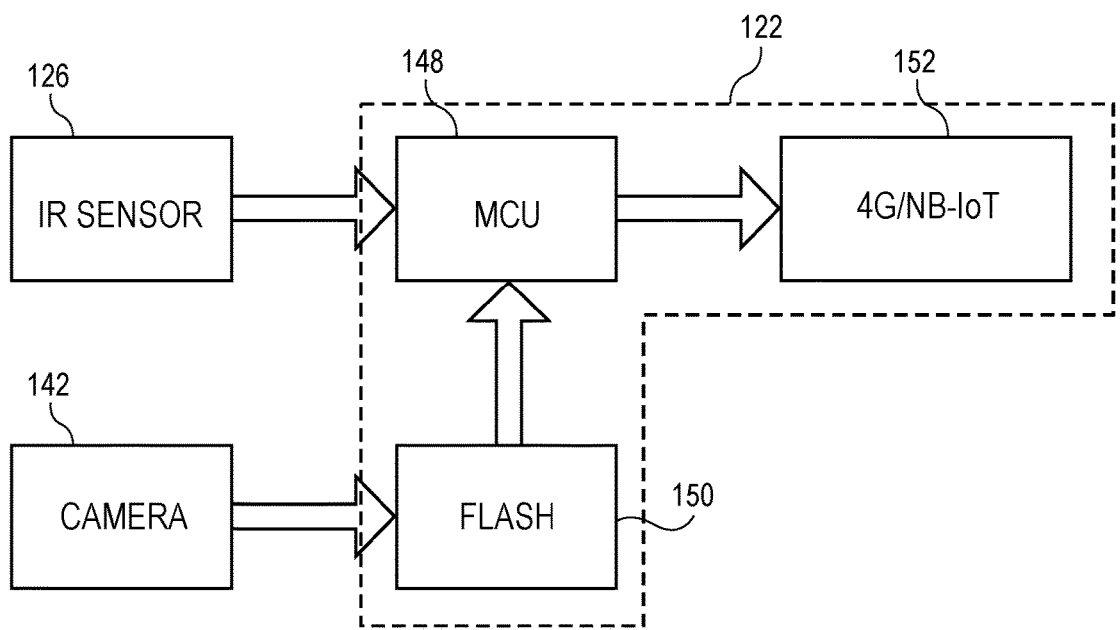
FIG. 7 illustrates a block diagram of an example electronic system for use with the insect trapping system of FIG. 1, according to at least one example.

The sensor communications package 122, as illustrated with respect to FIG. 7, includes a microcontroller unit 148, a memory module 150, and a transceiver 152. FIG. 7 illustrates system components including the sensor communication package 122, an imaging device 142, and the sensor package 126. The microcontroller unit 148 is used to process data, control other components, and enable communication. For example, the output of the sensor package 126 (e.g., an analog signal) will be fed into the microcontroller unit 148 with an ADC to count the number of insects 116 entering the container 102. Moreover, the date and time of each insect entrance are stamped in the microcontroller unit 148. Timestamp data is valuable to determine when insect populations are most active.

As the insect trapping system 100 functions as a remote monitoring device for insects 116, the sensor communication package 122 includes the transceiver 152 that can transmit data to a cloud platform through appropriate Internet of Things (IoT) communications technologies, e.g., 4G/Narrowband Internet of Things (NB-IoT)/5G IoT technologies, etc. In some examples, the transceiver 152 is selected to focus on low-power wide-area (LPWA) Internet of Things technology. LPWA technology includes a number of similar IoT communications techniques, which boast low power consumption and wide coverage areas for energy-efficient sensor communications.

In some examples, the memory module 150, which can include Flash or other comparable memory, can be used to store images taken by the imaging device 142 or other data collected by the insect trapping system 100 (e.g., the count data captured by the sensor package 126). The images can be sent using the transceiver 152 to the cloud platform by telemetry for identification via artificial intelligence, human reviewing, or in any other suitable manner. In some use scenarios, raw images can be locally processed with other results information being sent to the cloud in an effort to reduce unnecessary communications and save battery, i.e., so-called intelligent edge computing. In some examples, the transceiver 152 enables real-time data transfer to a cloud platform. In other examples, the transceiver 152 enables proximity-based readings, e.g., using short-range signals.

As shown in FIG. 2, within the second chamber 112b of the container 102 is mounted the imaging device 142 and one or more insect killing components (e.g., a glue panel 144 or an insecticide 146). The imaging device 142, as introduced herein, is configured to take images of the insects 116 that are captured in the second chamber 112b, e.g., those that have been killed by the insect killing component(s). In some examples, the interior surface of the second chamber 112b is smooth and/or otherwise devoid of structures to which the insects 116 can cling. This ensures that once the insects 116 are tired they will fall onto the glue panel 144 disposed on the floor, the walls, or other locations. In some examples, the interior surfaces of the second chamber 112b are coated with the insecticide 146 or include insecticide-treated paper or other absorbent material that includes insecticide disposed therein. In other examples, the insecticide 146 is sprayed or otherwise released into the second chamber 112b. Such release can be intermittent (e.g., every few minutes), triggered by insects 116 entering the second chamber 112b, and in any other suitable manner (e.g., based on instructions from the microcontroller unit 148).

In some examples, a light source is mounted in the second chamber 112b to further attract the insects 116 to move from the first chamber 112a to the second chamber 112b. The light source may be powered by an internal power source and/or a general power source used to power the remaining electrical components of the insect trapping system 100.

The function of the insect trapping system 100 will now be described with respect to the path 115 of a male *Aedes* mosquito (e.g., the insect 116). For example, to begin, the container 102 is placed on the support stand 103 in an environment (e.g., indoors or outdoors where *Aedes* mosquitoes are known to be) and the components within the container 102 are initialized and configured (e.g., at a minimum, the acoustic lure device 120 is turned on). The black surface of the support stand 103 will initially attract one or more insects 116. In some examples, a single insect's flight path 116 will about align with the top surface of the support stand 103. The insect 116 flying in front of the container 102 will sense the acoustic tone 130 emitting from the acoustic lure device 120 via the entrance hole 111. The acoustic tone 130 will attract the insect 116 to enter the first chamber 112a of the container 102 via the entrance hole 111. While not required, in some examples, the sensor package 126 detects when the insect 116 passes through the entrance hole 111. The sensor package 126 can send sensor data to the sensor communication package 122 to process the sensor data in order to, for example, count the number of insects 116 that have entered the first chamber 112a.

After entering the first chamber 112a, the insects 116 will likely continue toward the speaker component 124 and attempt to mate with the speaker component 124. Even if the insects 116 do not attempt to mate with the speaker component 124, the insects 116 will be motivated to find an exit from the first chamber 112a, but are unlikely to go back out through the entrance hole 111, the area around which is darkened. As such, the insects 116 will head to one of the interior walls of the container 102 and follow it until the insects 116 find an opening. The opening that the insects 116 will find is the window 114 in the diverter wall 110, which leads into the second chamber 112b. While not required, in some examples, a second sensor package 126 is mounted adjacent the window 114 in order to detect when the insects 116 pass from the first chamber 112a to the second chamber 112b. Once the insects 116 are within the second chamber 112*b*, they may be sprayed with insecticide, land on an insecticide coated surface, or land on a sticky surface and become stuck. Sensor data from the second sensor package 126 can be used to trigger a spray of insecticide. In some examples, while not required, the imaging device 142 captures images of the insects 116 within the second chamber 112*b*, which may include insects 116 that are stuck to sticky surfaces or have otherwise been killed. In some examples, the sensor data from the second sensor package 126 is used to trigger capturing of images of the insects.

Information gathered from the sensor package(s) 126 and from the imaging device 142, along with any data generated by the sensor communication package 122 (e.g., counts, timestamps, etc.), may be stored locally and shared with a remote system later, may be shared intermittingly with the remote system, may be shared continuously with the remote system, and may be shared in any other suitable manner (e.g., via a USB flash drive). In some examples, this data may be processed locally before being shared with any remote system. For example, image data may be processed locally to determine insect count, the image data may be disregarded, and only the count data is stored and shared.

Generally, the insect trapping system 100 has been designed such that components can be added and/or removed depending on the insect population being targeted and the environment in which it is being deployed. For example, were the insect trapping system 100 deployed in an area where the insects are sensitive to insecticide, the diverter wall 110 and other components may be excluded such that the insect trapping system 100 includes the container 102 with one internal chamber, the acoustic lure device 120, and a killing agent such as spray, glue panel, or oil sprayed on the interior walls of the container 102. In this example, the insects 116 are lured into the container 102 and die once inside. Even with such components excluded from the system 100, the use of the acoustic lure device 120 in combination with the visual lure 103 may produce suitable capture rates.

Figure 8:
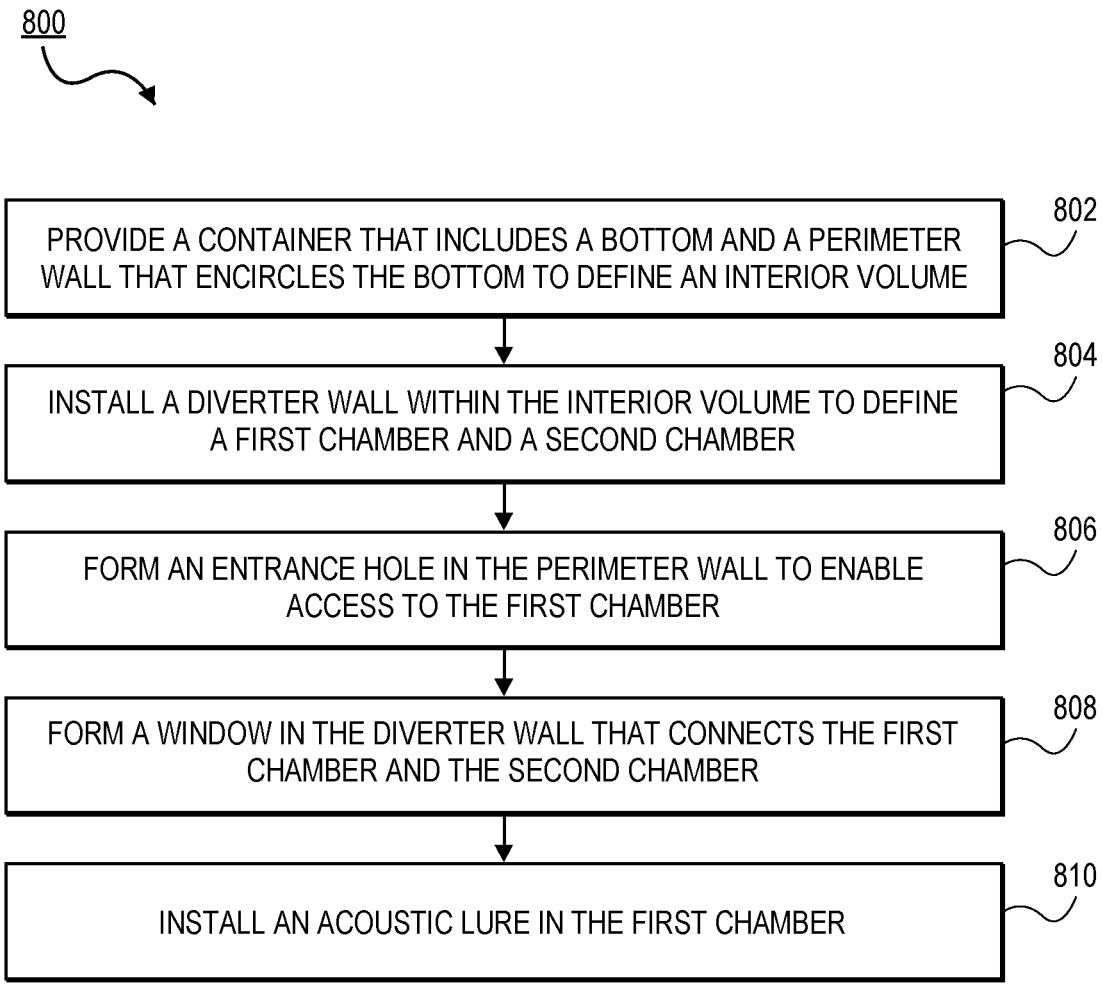
FIG. 8 illustrates a flow chart showing a process for assembling an insect trapping system, according to at least one example.

FIG. 8 illustrates a flow chart showing a process 800 for assembling insect trapping system such as the insect trapping system 100, according to at least one example. The process 800 may be performed by one or more machines, one or more human users, or some combination of the foregoing. In some examples, a portion of the insect trapping system 100 may be formed and/or assembled at a manufacturing location and another portion may be formed and/or assembled in the field (e.g., at a trapping location).

The process 800 begins at block 802 by providing a container that includes a bottom and a perimeter wall that encircles the bottom to define an interior volume. For example, a container such as the container 102 may be provided, which may be pre-formed. In some examples, providing the container may include forming the container.

At block 804, the process 800 includes installing a diverter wall within the interior volume to define a first chamber and a second chamber. For example, a diverter wall such as the diverter wall 110 may be provided. The diverter wall may be pre-formed and/or formed at the block 804. Installing the diverter wall may include positioning the diverter wall within the interior volume and securely connecting vertical edges of the diverter wall to vertical surfaces of the container.

At block 806, the process 800 includes forming an entrance hole in the perimeter wall to enable access to the first chamber. For example, an entrance hole such as the entrance hole 111 may be formed in the perimeter wall. Depending on the material of the container (and the perimeter wall), forming the entrance hole may include cutting, stamping, punching, or using any other suitable process for forming an opening. The size and shape of the entrance hole may depend on the type of insect that is targeted.

At block 808, the process 800 includes forming a window in the diverter wall that connects the first chamber and the second chamber. For example, a window such as the window 114 may be formed in the diverter wall. In some examples, the window in the diverter wall may be formed prior to the diverter wall being installed in the container (e.g., at the block 804). Depending on the material of the diverter wall, forming the window may include cutting, stamping, punching, or using any other suitable process for forming an opening in the diverter wall.

At block 810, the process 800 includes installing an acoustic lure in the first chamber. For example, an acoustic lure such as the acoustic lure device 120 may be installed in the first chamber. In some examples, the acoustic lure is installed in the first chamber with its speaker oriented towards the entrance hole so as to attract insects into the container via the entrance hole.

In some examples, the process 800 may further include placing the container on a support stand (e.g., the support stand 103). The support may be formed from a dark material and function as a base for the container.

In some examples, the process 800 may further include installing an insect killing component in the second chamber. For example, an insect killing component such as the glue panel 144 or the insecticide 146 may be installed in the second chamber. In this manner, the first chamber may be referred to as a luring chamber and the second chamber may be referred to as a killing chamber.

In some examples, the process 800 may further include installing a sensor package in the first chamber at a location between the entrance hole and the acoustic lure. For example, a sensor package such as the sensor package 126 may be installed in the first chamber. The sensor package may be used to detect when an insect passes through the entrance hole.

In some examples, the process 800 may further include installing a controller in at least one of the first chamber or the second chamber. For example, a controller such as the local controller 132 or the microcontroller unit 148 may be installed. The controller may include one or more processors. The controller may be configured to manage the operation of components installed and/or associated with the container (e.g., the acoustic lure, the sensor package, the insect killing component, etc.).

In some examples, the process 800 may further include installing a lid on the container to enclose the interior volume. For example, after the diverter wall, acoustic lure, and any other components (e.g., the controller, the sensor package, the insect killing component, etc.) have been installed in the container, the lid may be installed to enclose the interior volume. In some examples, the lid may form an air-tight fit with the container. In other examples, the fit between the lid and the container may allow at least some air to pass through.

Figure 9:
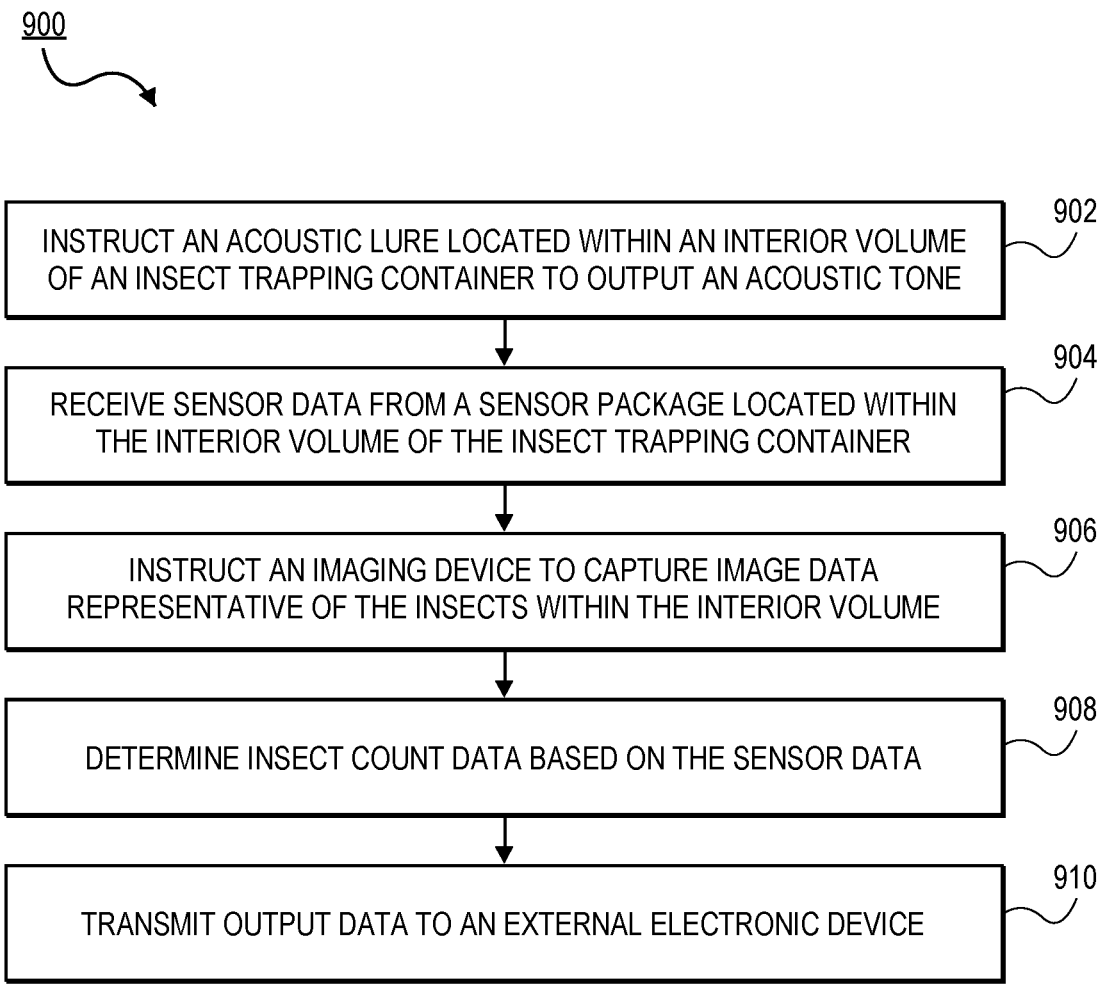
FIG. 9 illustrates a flow chart showing a process for operating aspects of the insect trapping system of FIG. 1, according to at least one example.

FIG. 9 illustrates an example flow diagram showing process 900 for operating an insect trapping system, according to at least one example. The process 900, and any other processes described herein, are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer readable storage medium, for example, in the form of a computer program including a plurality of instructions executable by one or more processors.

The process 900 may be performed by an internal computing device such as the controller 132 and/or the microcontroller unit 148. The process 900 begins at block 902 by internal computing device instructing an acoustic lure located within an interior volume of an insect trapping container to output an acoustic tone. In some examples, instructing the acoustic lure may include adjusting the output acoustic tone by adjusting one or more properties of the acoustic tone. These properties may be adjusted depending on a type of insect population. The one or more properties may include a frequency, a volume, or a duration.

In some examples, the insect trapping container may include a bottom, a lid, and at least one wall that together define the interior volume. The bottom, the lid, and/or the at least one wall may be formed from a transparent or translucent material.

At block 904, the process 900 includes the internal computing device receiving sensor data from a sensor package located within the interior volume of the insect trapping container. The sensor data may be representative of insects within the interior volume. The sensor package may include an infra-red sensor transmitter disposed above an entrance hole of the insect trapping container, an infra-red sensor receiver disposed above the entrance hole, and an optics lens disposed between the entrance hole and the infra-red sensor receiver. In some examples, the sensor package may be the sensor package 126.

At block 906, the process 900 includes the internal computing device, responsive to receiving the sensor data, instructing an imaging device to capture image data representative of the insects within the interior volume. In some examples, the imaging device may be the imaging device 142.

At block 908, the process 900 includes the internal computing device, responsive to receiving the sensor data, determining an insect count data based on the sensor data. Determining the insect count data may include determining the number of insects that have passed through the entrance hole. In some examples, the count may distinguish between types of insects, species of insects, sex of insects, and the like. For example, the count may indicate a number of target species of mosquitoes and a number of by-catch insects. In some examples, determining the insect count may be based on the image data.

At block 910, the process 900 includes the internal computing device transmitting output data to a remote computing system. The output data may include at least one of a first portion of the image data or a second portion of the insect count data. Transmitting the output data may include using the transceiver 152 to output the data to the remote computing system such as a smartphone, laptop computer, server computer, tablet, or the like.

In some examples, the process 900 may further include instructing an insect killing component located in the interior volume to emit an insecticide. The insecticide may be used to kill insects within the interior volume. The release of the insecticide may be triggered based on the presence of insects within the interior volume as determined at the block 906 and/or 908.

In some examples, the process 900 may further include receiving operational instructions from at least one of the remote computing system or a different remote computing system. The operational instructions may be stored by the internal computing device and used to manage the operation of the components of the insect trapping system.

Figure 10:
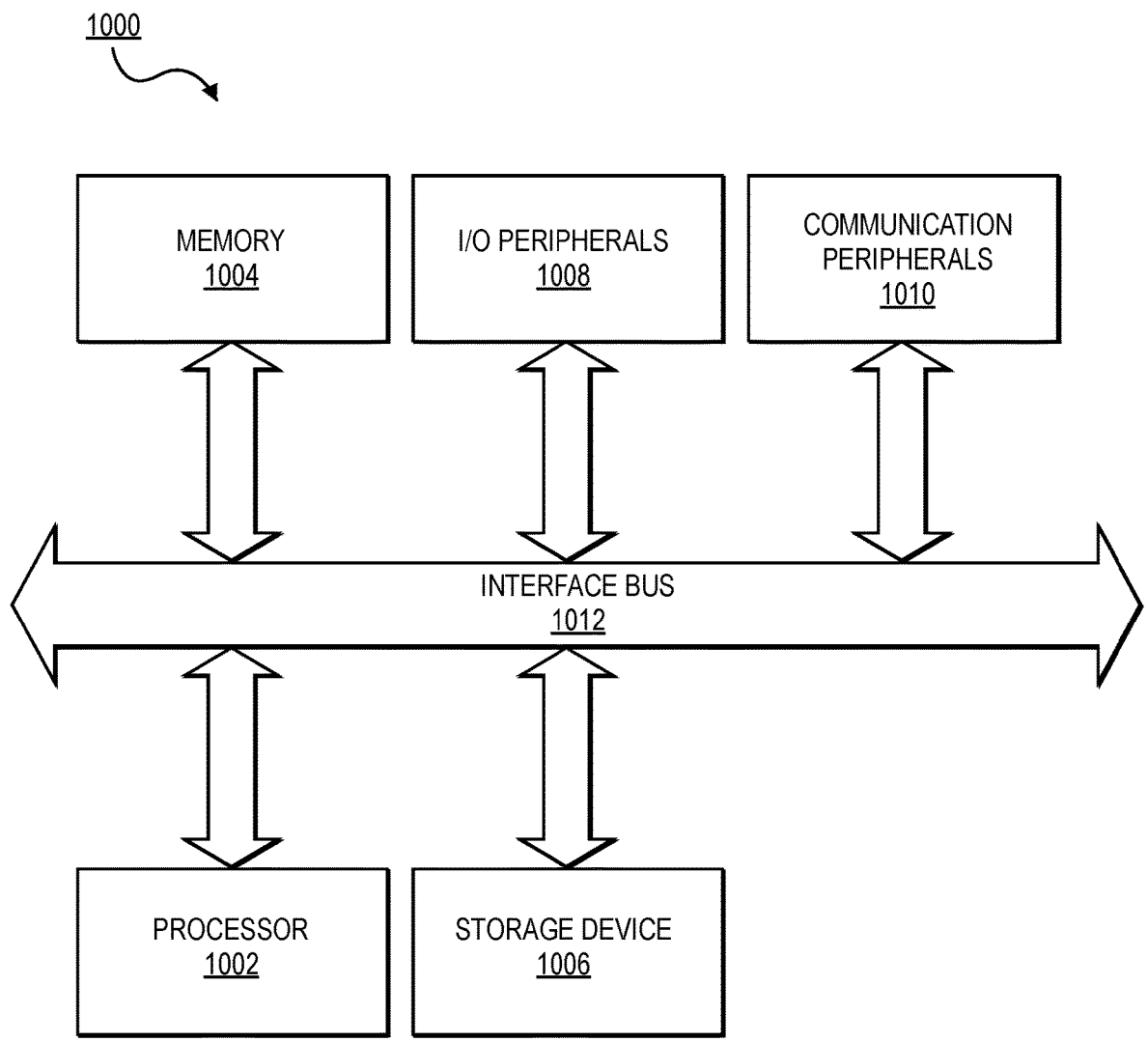
FIG. 10 illustrates a generic computing device for interacting with the insect trapping system, according to at least one example.

FIG. 10 illustrates examples of components of a computer system 1000, according to at least one example. The computer system 1000 may be a single computer such as a user computing device and/or can represent a distributed computing system such as one or more server computing devices. The computer system 1000 is an example of the internal computing device, the controller 132, and/or the microcontroller unit 148.

The computer system 1000 may include at least a processor 1002, a memory 1004, a storage device 1006, input/output peripherals (I/O) 1008, communication peripherals 1010, and an interface bus 1012. The interface bus 1012 is configured to communicate, transmit, and transfer data, controls, and commands among the various components of the computer system 1000. The memory 1004 and the storage device 1006 include computer-readable storage media, such as Radom Access Memory (RAM), Read ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. The memory 1004 and the storage device 1006 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 1000.

Further, the memory 1004 includes an operating system, programs, and applications. The processor 1002 is configured to execute the stored instructions and includes, for example, a logical processing unit, a microprocessor, a digital signal processor, and other processors. The memory 1004 and/or the processor 1002 can be virtualized and can be hosted within another computing system of, for example, a cloud network or a data center. The I/O peripherals 1008 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1008 are connected to the processor 1002 through any of the ports coupled to the interface bus 1012. The communication peripherals 1010 are configured to facilitate communication between the computer system 1000 and other computing devices over a communications network and include, for example, a network interface controller, modem, wireless and wired interface cards, antenna, and other communication peripherals.

In the following, further examples are described to facilitate the understanding of the present disclosure.

Example 1

In this example, there is provided an insect trapping system, including:
- a trapping container including a top, a bottom, and at least one side wall which together define an interior volume, wherein an entrance hole is formed in the at least one side wall and allows access to the interior volume;
- an acoustic lure device disposed within the interior volume of the trapping container adjacent the entrance hole, the acoustic lure device to output an acoustic tone for an insect population; and
- a support stand to physically support the trapping container, the support stand to function as a visual lure for the insect population.

Example 2

In this example, there is provided an insect trapping system of any of the preceding or subsequent examples, wherein the trapping container is formed from a clear material or a translucent material.

Example 3

In this example, there is provided an insect trapping system of any of the preceding or subsequent examples, wherein the entrance hole is formed as an inverted triangle, with a base leg at a first elevation and an apex at a second elevation that is below the first elevation.

Example 4

In this example, there is provided an insect trapping system of any of the preceding or subsequent examples, wherein the insect population includes at least one of a sex of mosquitoes or a species of mosquitoes.

Example 5

In this example, there is provided an insect trapping system of any of the preceding or subsequent examples, wherein the species of mosquitoes includes at least one of *Aedes aegypti* or *Aedes albopictus*.

Example 6

In this example, there is provided an insect trapping system of any of the preceding or subsequent examples, wherein one or more first properties of the acoustic tone and one or more second properties of the support stand are selected based at least in part on the species of mosquitoes.

Example 7

In this example, there is provided an insect trapping system of any of the preceding or subsequent examples, wherein the one or more first properties of the acoustic tone comprise a frequency, a volume, or a duration, and the one or more second properties of the support stand comprise a color or a height.

Example 8

In this example, there is provided an insect trapping system of any of the preceding or subsequent examples, further including:
- a controller including one or more processors; and
- one or more of:
  - a sensor package to detect when an insect passes through the entrance hole;
  - a transceiver device;
  - a memory module; or
  - an imaging device to capture images of the insect within the interior volume.

Example 9

In this example, there is provided an insect trapping system of any of the preceding or subsequent examples, wherein the sensor package includes an infra-red sensor transmitter disposed at a first side of the entrance hole, an infra-red sensor receiver disposed at a second side of the entrance hole, and an optics lens disposed between the entrance hole and the infra-red sensor receiver.

Example 10

In this example, there is provided an insect trapping system of any of the preceding or subsequent examples, wherein the one or more processors are configured to: receive sensor data from the sensor package; and perform at least one action after receiving the sensor data.

Example 11

In this example, there is provided an insect trapping system of any of the preceding or subsequent examples, wherein the at least one action includes determining a count of individual insects detected by the sensor package.

Example 12

In this example, there is provided an insect trapping system of any of the preceding or subsequent examples, wherein the at least one action further includes at least one of storing the count locally within the memory module or transmitting the count via the transceiver device to a remote computing system.

Example 13

In this example, there is provided an insect trapping system of any of the preceding or subsequent examples, wherein the one or more processors are configured to:
- activate the imaging device to capture images of insects within the interior volume;
- activate the acoustic lure device to output the acoustic tone;
- cause transmission of output data via the transceiver device; or
- receive and store input data received via the transceiver device.

Example 14

In this example, there is provided an insect trapping system of any of the preceding or subsequent examples, wherein the trapping container includes a diverter wall that divides the interior volume to define a first chamber and a second chamber, wherein a window is formed in the diverter wall that connects the first chamber and the second chamber.

Example 15

In this example, there is provided an insect trapping system of any of the preceding or subsequent examples, further including an insect killing component disposed within the interior volume, the insect killing component including at least one of a glue panel or an insecticide.

Example 16

In this example, there is provided an insect trapping system of any of the preceding or subsequent examples, wherein the acoustic lure device is disposed in the first chamber and the insect killing component is disposed in the second chamber.

Example 17

In this example, there is provided an insect trapping system of any of the preceding or subsequent examples, wherein the acoustic lure device is disposed within the first chamber, and the insect trapping system further includes an imaging device disposed within the second chamber, the imaging device configured to capture images of insects within the second chamber.

Example 18

In this example, there is provided an insect trapping system of any of the preceding or subsequent examples, wherein the diverter wall includes a curved V-shape, wherein distal edges of the diverter wall physically contact opposing surfaces of the at least one side wall and the window is formed in a vertex region of the curved V-shape.

Example 19

In this example, there is provided an apparatus, including:
a trapping container including a top, a bottom, and at least one side wall that together define an interior volume;
a diverter wall positioned within the interior volume, the diverter wall dividing the interior volume to define a first chamber and a second chamber, wherein a window is formed in the diverter wall that connects the first chamber and the second chamber, and wherein an entrance hole is formed in the at least one side wall and allows access to the first chamber; and
an acoustic lure device disposed within the first chamber adjacent the entrance hole, the acoustic lure device to output an acoustic tone.

Example 20

In this example, there is provided an apparatus of any of the preceding or subsequent examples, further including a controller located in the interior volume, the controller including one or more processors.

Example 21

In this example, there is provided an apparatus of any of the preceding or subsequent examples, further including a sensor package located in the first chamber adjacent to the entrance hole, the sensor package to detect when an insect passes through the entrance hole.

Example 22

In this example, there is provided an apparatus of any of the preceding or subsequent examples, further including a transceiver device to transmit sensor data from the sensor package to a remote computing system.

Example 23

In this example, there is provided an apparatus of any of the preceding or subsequent examples, wherein a first area on an exterior surface of the at least one side wall surrounding the entrance hole is coated with a light-colored material, and a second area on an interior surface of the at least one side wall surrounding the entrance hole is coated with a dark-colored material.

Example 24

In this example, there is provided an apparatus of any of the preceding or subsequent examples, further including an insect killing component disposed within the second chamber, the insect killing component including at least one of a glue panel or an insecticide.

Example 25

In this example, there is provided a method, including:
providing a container that includes a bottom and a perimeter wall that encircles the bottom to define an interior volume;
installing a diverter wall within the interior volume to define a first chamber and a second chamber;
forming an entrance hole in the perimeter wall to enable access to the first chamber;
forming a window in the diverter wall that connects the first chamber and the second chamber; and
installing an acoustic lure in the first chamber.

Example 26

In this example, there is provided a method of any of the preceding or subsequent examples, further including installing a lid on the container to enclose the interior volume.

Example 27

In this example, there is provided a method of any of the preceding or subsequent examples, further including installing an insect killing component in the second chamber.

Example 28

In this example, there is provided a method of any of the preceding or subsequent examples, further including installing a controller in at least one of the first chamber or the second chamber, the controller including one or more processors.

Example 29

In this example, there is provided a method of any of the preceding or subsequent examples, further including installing a sensor package in the first chamber at a location between the entrance hole and the acoustic lure, the sensor package to detect when an insect passes through the entrance hole.

Example 30

In this example, there is provided a computer-implemented method, including:
  instructing an acoustic lure located within an interior volume of an insect trapping container to output an acoustic tone;
  receiving sensor data from a sensor package located within the interior volume of the insect trapping container, the sensor data representative of insects within the interior volume;
  responsive to receiving the sensor data:
    instructing an imaging device to capture image data representative of the insects within the interior volume; or
    determining insect count data based on the sensor data; and
  transmitting output data to a remote computing system, the output data including at least one of a first portion of the image data or a second portion of the insect count data.

Example 31

In this example, there is provided a computer-implemented method of any of the preceding or subsequent examples, wherein one or more properties of the acoustic tone are adjusted depending on a type of insect population, the one or more properties including a frequency, a volume, or a duration.

Example 32

In this example, there is provided a computer-implemented method of any of the preceding or subsequent examples, wherein the sensor package includes: an infra-red sensor transmitter disposed on a first side of an entrance hole of the insect trapping container, an infra-red sensor receiver disposed on a second side of the entrance hole, and an optics lens disposed between the entrance hole and the infra-red sensor receiver.

Example 33

In this example, there is provided a computer-implemented method of any of the preceding or subsequent examples, further including instructing an insect killing component located in the interior volume to emit an insecticide.

Example 34

In this example, there is provided a computer-implemented method of any of the preceding or subsequent examples, further including receiving operational instructions from at least one of the remote computing system or a different remote computing system.

Example 35

In this example, there is provided a computer-implemented method of any of the preceding or subsequent examples, wherein the insect trapping container includes a bottom, a lid, and at least one wall that together define the interior volume, at least one of the bottom, the lid, or the at least one wall formed from a transparent or translucent material.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and all three of A and B and C.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An insect trapping system, comprising:
    a trapping container comprising:
        a top;
        a bottom;
        at least one side wall, which together with the top and the bottom defines an interior volume, wherein an entrance hole is formed in the at least one side wall and allows access to the interior volume, wherein the top is characterized by a planar interior surface that faces the interior volume; and
    a diverter wall that extends between the planar interior surface of the top and the bottom and that divides the interior volume to define a first chamber and a second chamber, wherein distal edges of the diverter wall physically contact opposing surfaces of the at least one side wall, wherein the diverter wall is characterized by a length extending between the distal edges and a vertex region, wherein the vertex region is defined along the length, wherein a window is formed in the vertex region and is characterized by an axis that is transverse to the length, wherein the window is defined by a pair of opposing substantially parallel edges and connects the first chamber and the second chamber, and wherein a distal portion of the diverter wall is characterized by an edge profile that is held in physical contact with the planar interior surface;
    an acoustic lure device disposed within the first chamber between the entrance hole and the window, the acoustic lure device to output an acoustic tone for an insect population; and
    a support stand to physically support the trapping container, the support stand to function as a visual lure for the insect population.

2. The insect trapping system of claim 1, wherein the entrance hole is formed as an inverted triangle, with a base leg at a first elevation and an apex at a second elevation that is below the first elevation.

3. The insect trapping system of claim 1, wherein the insect population comprises at least one of a sex of mosquitoes or a species of mosquitoes.

4. The insect trapping system of claim 3, wherein the species of mosquitoes comprises at least one of *Aedes aegypti* or *Aedes albopictus*.

5. The insect trapping system of claim 3, wherein one or more first properties of the acoustic tone and one or more second properties of the support stand are selected based at least in part on the species of mosquitoes.

6. The insect trapping system of claim 5, wherein the one or more first properties of the acoustic tone comprise a frequency, a volume, or a duration, and the one or more second properties of the support stand comprise a color or a height.

7. The insect trapping system of claim 1, further comprising:
    a controller comprising one or more processors; and
        one or more of:
            a sensor package to detect when an insect passes through the entrance hole;
            a transceiver device;
            a memory module; or
            an imaging device to capture images of the insect within the interior volume.

8. The insect trapping system of claim 7, wherein the sensor package comprises an infra-red sensor transmitter disposed at a first side of the entrance hole, an infra-red sensor receiver disposed at a second side of the entrance hole, and an optics lens disposed between the entrance hole and the infra-red sensor receiver.

9. The insect trapping system of claim 7, wherein the one or more processors are configured to:
    receive sensor data from the sensor package; and
    perform at least one action after receiving the sensor data.

10. The insect trapping system of claim 9, wherein the at least one action comprises determining a count of individual insects detected by the sensor package.

11. The insect trapping system of claim 10, wherein the at least one action further comprises at least one of storing the count locally within the memory module or transmitting the count via the transceiver device to a remote computing system.

12. The insect trapping system of claim 7, wherein the one or more processors are configured to:
    activate the imaging device to capture images of insects within the interior volume;
    activate the acoustic lure device to output the acoustic tone;
    cause transmission of output data via the transceiver device; or
    receive and store input data received via the transceiver device.

13. The insect trapping system of claim 1, further comprising an insect killing component comprising at least one of a glue panel or an insecticide.

14. The insect trapping system of claim 13, wherein the insect killing component is disposed in the second chamber.

15. The insect trapping system of claim 13, further comprising an imaging device disposed within the second chamber, the imaging device configured to capture images of insects within the second chamber.

16. An apparatus, comprising:
    a trapping container comprising a top, a bottom, and at least one side wall that together define an interior volume, wherein the top is characterized by a planar interior surface that faces the interior volume;
    a diverter wall that extends between the planar interior surface of the top and the bottom and is positioned within the interior volume, the diverter wall dividing the interior volume to define a first chamber and a second chamber, wherein distal edges of the diverter wall physically contact opposing surfaces of the at least one side wall, wherein the diverter wall is characterized by a length extending between the distal edges and a vertex region, wherein the vertex region is defined along the length, wherein a window is formed in the vertex region of the diverter wall that connects the first chamber and the second chamber, wherein the window is characterized by an axis that is transverse to the length, wherein the window is defined by a pair of opposing substantially parallel edges, wherein an entrance hole is formed in the at least one side wall and allows access to the first chamber, and wherein a distal portion of the diverter wall is characterized by an edge profile that is held in physical contact with the planar interior surface; and an acoustic lure device disposed within the first chamber between the entrance hole and the window, the acoustic lure device to output an acoustic tone.

17. The apparatus of claim 16, further comprising a controller located in the interior volume, the controller comprising one or more processors.

18. The apparatus of claim 16, further comprising a sensor package located in the first chamber adjacent to the entrance hole, the sensor package to detect when an insect passes through the entrance hole.

19. The apparatus of claim 18, further comprising a transceiver device to transmit sensor data from the sensor package to a remote computing system.

20. The apparatus of claim 16, wherein a first area on an exterior surface of the at least one side wall surrounding the entrance hole is coated with a light-colored material, and a second area on an interior surface of the at least one side wall surrounding the entrance hole is coated with a dark-colored material.

21. The apparatus of claim 16, further comprising an insect killing component disposed within the second chamber, the insect killing component comprising at least one of a glue panel or an insecticide.

22. A method, comprising:
providing a container that comprises a top, a bottom, and a perimeter wall that encircles the bottom to define an interior volume, wherein the top is characterized by a planar interior surface that faces the interior volume;
installing a diverter wall within the interior volume that extends between the planar interior surface of the top and the bottom and defines a first chamber and a second chamber, wherein distal edges of the diverter wall contact opposing surfaces of the perimeter wall, wherein the diverter wall is characterized by a length extending between the distal edges and a vertex region, and wherein the vertex region is defined along the length;
forming an entrance hole in the perimeter wall to enable access to the first chamber;
forming a window in the vertex region of the diverter wall that connects the first chamber and the second chamber, wherein the window is characterized by an axis that is transverse to the length, wherein the window is defined by a pair of opposing substantially parallel edges, and wherein a distal portion of the diverter wall is characterized by an edge profile that is held in physical contact with the planar interior surface; and
installing an acoustic lure in the first chamber.

23. The method of claim 22, further comprising:
installing an insect killing component in the second chamber.

24. The method of claim 22, further comprising:
installing a controller in at least one of the first chamber or the second chamber, the controller comprising one or more processors; and
installing a sensor package in the first chamber at a location between the entrance hole and the acoustic lure, the sensor package to detect when an insect passes through the entrance hole.

25. The insect trapping system of claim 1, wherein the at least one side wall and the diverter wall of the trapping container are formed from a transparent or translucent material, and wherein the support stand is formed from an opaque dark-colored material.

26. The insect trapping system of claim 1, wherein the diverter wall has a curved V-shape, with the vertex region being defined at a valley of the curved V-shape.

27. The insect trapping system of claim 26, wherein the diverter wall is oriented with an interior of the curved V shape directed toward the entrance hole.

28. The insect trapping system of claim 1, wherein the top is removably connectable to the at least one side wall.

29. The insect trapping system of claim 1, wherein the edge profile is defined at a first top edge of the diverter wall, wherein the vertex region extends between the first top edge of the diverter wall and a first bottom edge of the diverter wall that is opposite the first top edge, and wherein the window is defined between the first top edge and the first bottom edge.

30. The insect trapping system of claim 1, wherein the distal edges of the diverter wall are substantially parallel, and wherein the opposing surfaces of the at least one side wall at which the distal edges contact are substantially parallel.

* * * * *